US012003163B2

(12) United States Patent
Nishio et al.

(10) Patent No.: US 12,003,163 B2
(45) Date of Patent: Jun. 4, 2024

(54) ACTUATOR AND VEHICLE OPERATION SYSTEM WITH ACTUATOR

(71) Applicant: DENSO CORPORATION, Kariya (JP)

(72) Inventors: Daisuke Nishio, Kariya (JP); Tomoki Yamashita, Kariya (JP); Itsuki Funaba, Kariya (JP); Kazuto Kitou, Kariya (JP)

(73) Assignee: DENSO CORPORATION, Kariya (JP)

( * ) Notice: Subject to any disclaimer, the term of this patent is extended or adjusted under 35 U.S.C. 154(b) by 206 days.

(21) Appl. No.: 17/386,079

(22) Filed: Jul. 27, 2021

(65) Prior Publication Data
US 2022/0029502 A1    Jan. 27, 2022

(30) Foreign Application Priority Data

Jul. 27, 2020    (JP) .................. 2020-126805

(51) Int. Cl.
| | | |
|---|---|---|
| *H02K 5/22* | (2006.01) | |
| *B60N 2/02* | (2006.01) | |
| *B60S 1/08* | (2006.01) | |
| *E05F 15/697* | (2015.01) | |
| *H02K 11/30* | (2016.01) | |
| *H02K 15/00* | (2006.01) | |

(52) U.S. Cl.
CPC ......... *H02K 5/225* (2013.01); *B60N 2/02246* (2023.08); *B60S 1/08* (2013.01); *E05F 15/697* (2015.01); *H02K 11/30* (2016.01); *H02K 15/00* (2013.01); *E05Y 2201/434* (2013.01); *E05Y 2201/702* (2013.01); *E05Y 2201/716* (2013.01); *E05Y 2900/55* (2013.01)

(58) Field of Classification Search
CPC ........ H02K 5/225; H02K 11/30; H02K 15/00; H02K 5/08; H02K 7/116; H02K 11/0094; B60N 2/0232; B60N 2002/0236; B60N 2002/024; B60S 1/08; B60S 1/166; E05F 15/697; E05Y 2201/434; E05Y 2201/702; E05Y 2201/716; E05Y 2900/55; E05Y 2201/10; E05Y 2201/704; E05Y 2400/61; E05Y 2400/60; E05Y 2400/65; H01R 13/40; H01R 13/502
USPC .......................................................... 310/71
See application file for complete search history.

(56) References Cited

U.S. PATENT DOCUMENTS

| | | | | |
|---|---|---|---|---|
| 6,912,994 B2* | 7/2005 | Ozeki | ................... | F02D 9/1065 123/399 |
| 2015/0075311 A1* | 3/2015 | Kanzaki | .................. | F16H 57/02 74/421 A |
| 2015/0381016 A1* | 12/2015 | Tsuda | ..................... | H02K 11/35 310/68 B |

(Continued)

FOREIGN PATENT DOCUMENTS

| | | |
|---|---|---|
| JP | 2009-303452 A | 12/2009 |
| JP | 2009-303453 A | 12/2009 |
| JP | 2017-068943 A | 4/2017 |

*Primary Examiner* — Thomas Truong
(74) *Attorney, Agent, or Firm* — Oliff PLC

(57) ABSTRACT

An actuator and a vehicle operation system with the actuator. The actuator includes a housing unit composed of a combination of internal components including a motor, a housing and a cover. A pair of terminals conveys external power to the motor. A terminal holder holds die pair of terminals. The terminal holder is accommodated in the housing unit as a sub-assembly separately from the housing unit.

10 Claims, 9 Drawing Sheets

(56) References Cited

U.S. PATENT DOCUMENTS

| | | | |
|---|---|---|---|
| 2016/0126680 A1* | 5/2016 | Maeda | H02K 11/0094 439/620.21 |
| 2022/0029502 A1* | 1/2022 | Nishio | B60N 2/02253 |

* cited by examiner

ACTUATOR AND VEHICLE OPERATION SYSTEM WITH ACTUATOR

CROSS-REFERENCE TO RELATED APPLICATION

This patent application is based on and claims priority to Japanese Patent Application No. 2020-126805, filed on Jul. 27, 2020 in the Japan Patent office, the entire disclosure of which is hereby incorporated by reference herein.

BACKGROUND

Technical Field

This disclosure relates to actuators and vehicle operation systems with the actuators.

Related Art

As proposed in the past, a known actuator includes a housing unit for accommodating a motor and a terminal that conveys electric power supplied from an outside to the motor. The housing unit is composed of a housing body and a cover. When the known actuator is assembled, the terminal is integrated with the cover and internal parts, such as motors, etc., are installed in the housing body. Then, the cover integrated with the terminal is attached to the housing body.

Accordingly, in the known actuator, when the cover is attached to the housing body, the terminal is connected accordingly to the motor. However, a large stress may occur in the terminal at a portion thereof connected to the motor at the time, thereby causing a deformation.

Hence, a purpose of the present disclosure is to address and resolve such a problem and provide a novel actuator capable of decreasing stress generated in the terminal of the actuator, which conveys electric power supplied from the outside to the motor.

SUMMARY

Accordingly, one aspect of the present disclosure provides a novel actuator that includes a housing unit composed of a combination of internal components including a motor, a housing and a cover. A pair of terminals conveys external power to the motor. A terminal holder holds the pair of terminals. The terminal holder is separately accommodated in the housing unit from the housing unit as a sub-assembly.

In another aspect of the present disclosure provides a novel vehicle operation system with the above-described actuator, in which the vehicle operation system is composed of one of a wiper system, a power window system, and a power seat system. The actuator acts as a wiper motor when the vehicle operation system is composed of the wiper system. The actuator acts as a power window motor when the vehicle operation system is composed of the power window system. The actuator acts as a power seat motor when the vehicle operation system is composed of the power seat system.

In yet another aspect of the present disclosure provides a novel method of producing a sub-assembly composed of a pair of terminals for conveying external power to a motor and a terminal holder. The method comprises the steps of: preparing a conductive flat plate; applying a punching process to the conductive flat plate thereby obtaining a pair of elongated terminals partially connecting with each other via a connection portion at a middle portion along a longitudinal direction thereof; and bending each of the pair of elongated terminals substantially at a right angle in a plate thickness direction around a first axis at a first portion between the middle portion and a one end thereof. The method further comprises the steps of: bending each of the pair of elongated terminals substantially at a right angle in a plate thickness direction around a second axis perpendicular to the first axis at a second portion between the first portion and the one end thereof; inserting the pair of terminals into a molding mold; and molding a terminal holder by applying injection molding together with the pair of terminals other than bent portions bent in the bending processes while forming a through hole at a position above the connection portion connecting the pair of elongated terminals with each other. The method further comprises the step of cutting the connection portion and separating the pair of terminals from each other after the insert molding.

Hence, according to one aspect of the present disclosure, stress generated in a terminal accommodated in the actuator to supply external power to the motor can be reduced.

BRIEF DESCRIPTION OF THE DRAWINGS

A more complete appreciation of the present disclosure and many of the attendant advantages of the present disclosure will be more reading obtained as substantially the same becomes better understood by reference to the following detailed description when considered in connection with the accompanying drawings, wherein.

DETAILED DESCRIPTION

Figure 1:
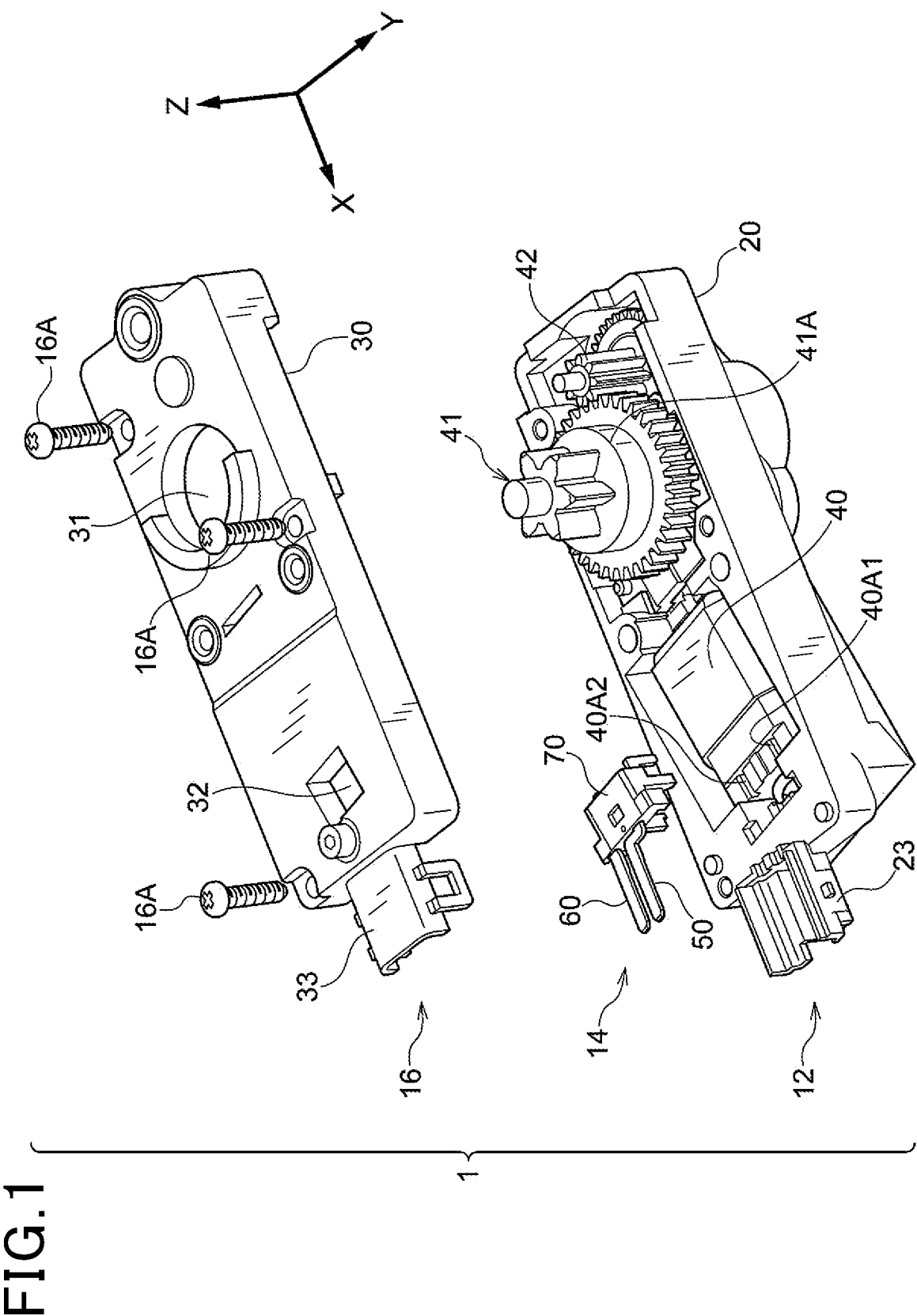
FIG. 1 is an exploded perspective view illustrating an actuator according to one embodiment of the present disclosure.

Referring now to the drawings, wherein like reference numerals designate identical or corresponding parts throughout the several views thereof, and to FIGS. 1 to 7, an actuator 1 according to one embodiment of the present disclosure will be herein below described.

In the following description, three dimensional directions of an X direction, a Y direction and a Z direction (i.e., a coordinate system) is utilized relative to an actuator 1 to precisely describe various embodiments of the present disclosure. Further, the X direction means a direction indicated by arrow X in each or applicable drawings. The Y direction means at direction indicated by arrow Y in each of applicable drawings. The Z direction means a direction indicated by arrow Z in each of applicable drawings.

FIG. 1 illustrates the actuator 1 during an assembly work. That is, the assembly work from a stage shown in FIG. 1 is performed as follows to complete assembly of the actuator 1. First, a holder sub-assembly 14 is coupled to a housing side member 12. A cover side member 16 is then coupled to the housing side member 12 already coupled to the holder sub-assembly. The housing side member 12 includes a housing 20 and various internal components (e.g., a motor 40, multiple transmission gears 42, an output gear 41 and the like). The holder sub-assembly 14 is composed of a pair of terminals 50 and 60 and a terminal holder 70 holding the pair of terminals 50 and 60. The cover side member 16 includes a cover 30 and multiple screw holes receiving screws 16A. Hence, the housing 20 and the cover 30 are fixed to each other by using the multiple screws 16A, thereby collectively constituting a housing unit (20 and 30).

Hereinafter, a specific configuration of the actuator 1 will be described herein below with reference to FIGS. 1 and 2 and applicable drawings.

The actuator 1 includes the motor 40 that rotates and drives upon receiving power supply. The motor 40 includes a pair of first and second motor terminal portions 40A1 and 40A2 connected to the pair of terminals 50 and 60 for the actuator 1, respectively. The motor 40 also includes an output shall 40B protruding from both sides of the motor 40 (see FIG. 2).

As described earlier, the housing unit (20 and 30) of the actuator 1 is composed of the housing 20 and the cover 30, thereby accommodating the internal components, such as the motor 40, etc., therein. The housing 20 and the cover 30 are made of insulating material (for example, synthetic resin or the like). The internal output gear 41 included in the actuator 1 acts as an actuator output shaft that outputs driving force from the motor 40 to an outside thereof, for example, a wiper unit, a power window unit, a power seat unit mounted on a vehicle. Multiple transmission gears 42 also included in the actuator 1 as internal components decelerate rotation speed of the motor 40 and transmit rotation decelerated in this way to the output gear 41. The output gear 41 and the transmission gears 42 collectively constitute a deceleration unit for decelerating a rotation speed of the motor 40 and for externally outputting decelerated rotation in this way.

Here, as understood from FIG. 1, the output gear 41 is a coaxial multistage gear and a part of stages of the output gear 41 protrudes to the outside of the housing unit (20 and 30) through an output gear insertion hole 31 formed on the cover 30. Hence, the driving force output from the output gear 41 can be used in various usages. Specifically, the actuator 1 can be a motor, such as a wiper motor, a power window motor, a power seat motor, etc.

Accordingly, in a completely assembled state of the actuator 1, the insertion portion 41A integral with the output gear 41 is inserted into the output gear insertion hole 31 of the cover 30. The output gear insertion hole 31 of the cover 30 has a size to allow the insertion portion 41A of the output gear 41 to exactly fit thereinto.

Figure 2:
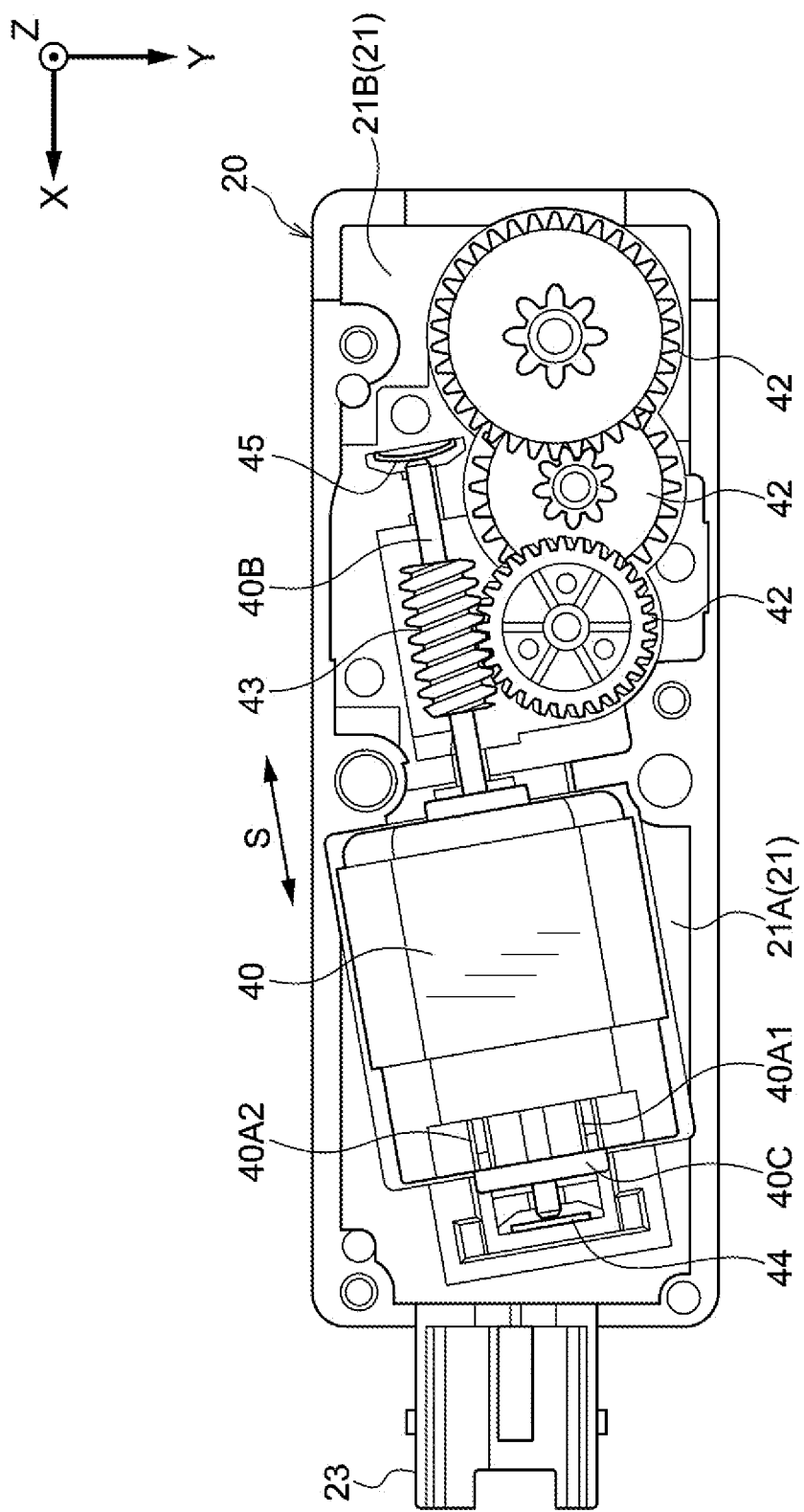
FIG. 2 is a plan view illustrating housing body side members by excluding output nears, etc., according, to one embodiment of the present disclosure.

Further, as shown in FIG. 2, the housing 20 is substantially rectangular having as longitudinal side extended in an X direction and a lateral side extended in a Y direction when viewed from a Z direction. The housing 20 includes an accommodation recess 21 that accommodates the internal components, such as the motor 40, the transmission gears 42, etc. The accommodation recess 21 is composed of a motor accommodation recess portion 21A that accommodate the motor 40 or the like and a gear accommodation recess portion 21B that accommodates the transmission gears 42 and the output gear 41. The motor accommodation recess portion 21A is formed in a one side section of the housing 20 deviating from a lateral center of the housing 20 in the X direction. The gear accommodation recess portion 21B is formed in the other side section of the housing 20 deviating from the lateral center of the housing 20 in the X direction.

The output shaft 408 of the motor 40 is directed in a direction inclining from the X direction serving as the longitudinal direction of the housing 20. Such a direction of the output shaft 408 is hereinbelow referred to as a thrusting direction S. A worm gear 43 is coaxially attached to the output shall 40B. Hence, the worm gear 43 is placed at another side inner space deviating from a vertical center of the housing. 20 in the direction. The transmission gears 42 are placed in one side inner space of the housing 20 vertically deviating from the worm gear 43 in the Y direction. Hence, the thrusting direction S is parallel to a XV plane.

Further, as shown in FIG. 2, the actuator includes a bearing plate 44 and a spring cone 45 as internal components. The bearing plate 44 and the spring cone 45 are placed between both ends of the output shaft 40B of the motor 40 and counter parts of the housing 20, respectively. With this, these ends of the output shaft 40B and the counter parts of the housing 20 are prevented from directly contacting each other. The bearing plate 44 is flat, and the spring cone 45 is arched thereby providing elasticity. With this, the output shaft 40B is inhibited from raffling in the housing 20. The bearing plate 44 is placed at a one side inner space of the housing 20 deviating from a lateral center of the housing 20 in the X direction. The spring cone 45 is placed at the other side inner space of the housing 20 deviating from the center of the housing 20 in the X direction.

Next, the pair of terminals 50 and 60 of sub-assembly 14 will be described more n detail with reference to FIG. 3.

The pair of terminals 50 and 60 are components for supplying external electric power to the motor 40 by electrically connecting a power supply with the motor 40. The power supply acts as an external power supply means for supplying power from an outside. The pair of terminals 50 and 60 are made of conductive material, such as metal (e.g., copper, gold, platinum), etc.

The pair of terminals 50 and 60 are composed of a first conductive member 50 that connects the first terminal portion 40A1 of the motor 40 with the power supply and a second conductive member 60 that connects the second terminal portion 40A2 of the motor 40 with the power supply.

Figure 6:
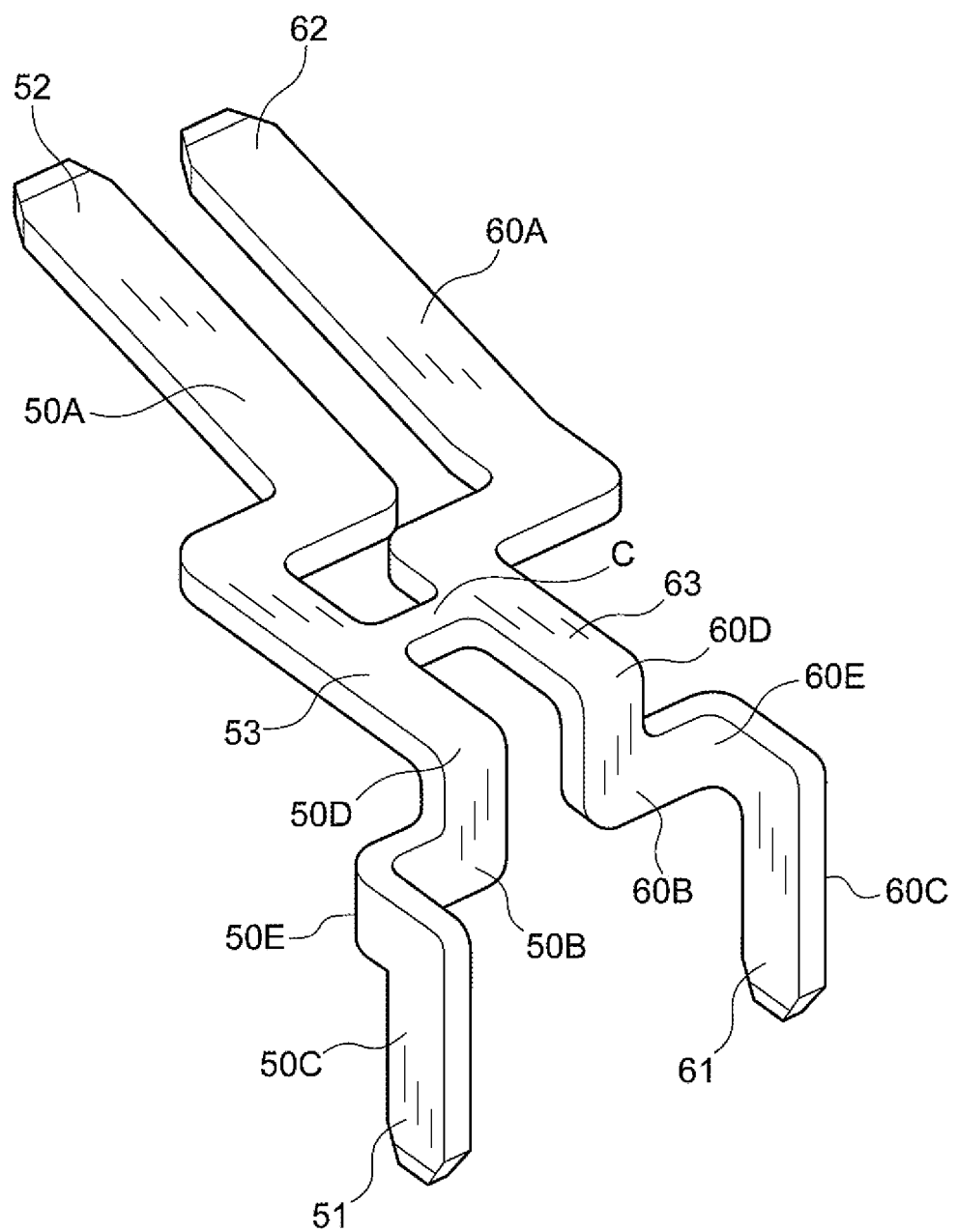
FIG. 6 is a perspective view illustrating the pair of terminals before being held by the terminal holder according to one embodiment of the present disclosure.
Figure 7:
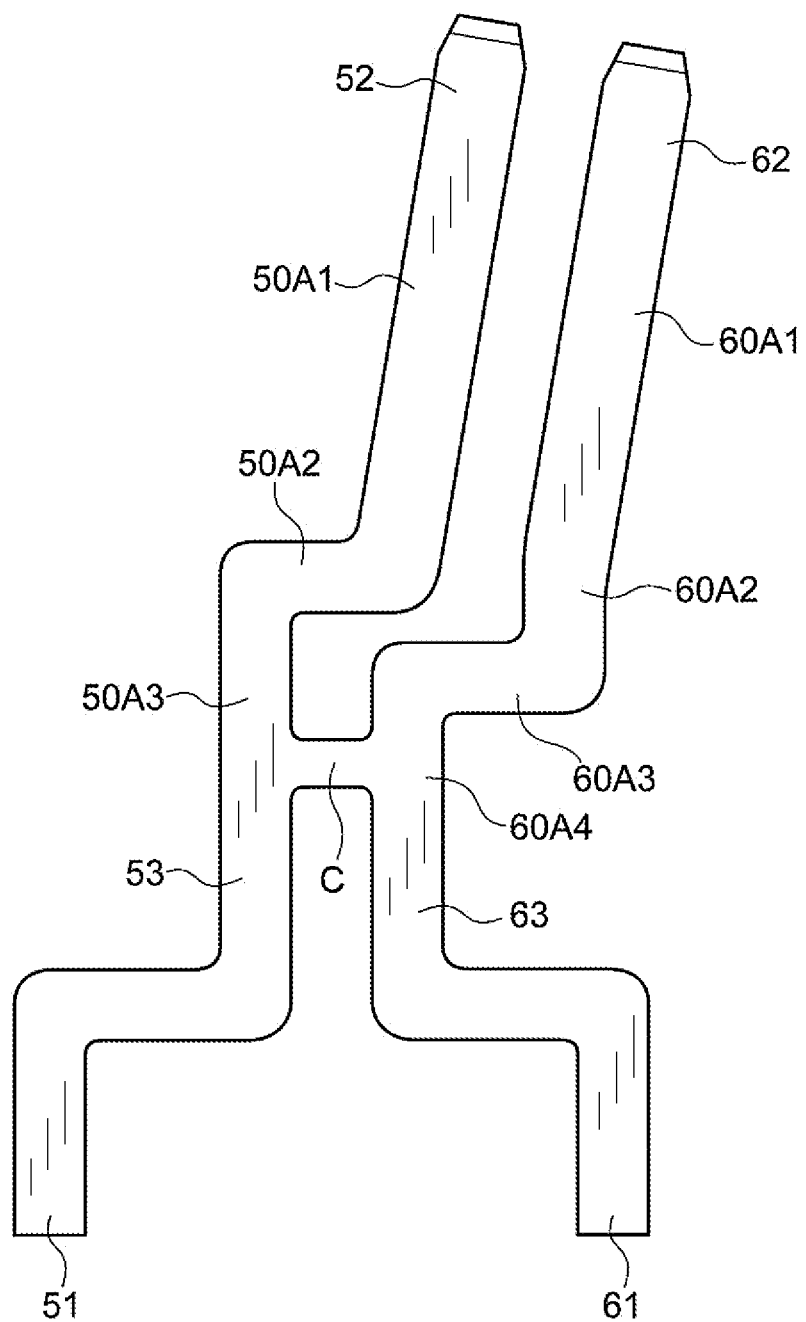
FIG. 7 is a perspective view illustrating the pair of terminals before a bending process is applied thereto according to one embodiment of the present disclosure.

The pair of terminals 50 and 60 are produced by applying a cutting process and bending process or the like in this order to a flat conductive plate. Specifically, as shown in FIGS. 6 and 7, in the middle of a production process of the actuator 1, the first conductive member 50 and the second conductive member 60 are connected to each other by a connection portion C.

The first conductive member 50 includes a first power supply portion 51 connected to the first motor terminal portion 40A1 of the motor 40, a first held portion 53 held by the terminal holder 70, and a first connector portion 52 connected to the power supply. The second conductive member 60 includes a second power supply portion 61 connected to the second motor terminal portion 40A2 of the motor 40, a second held portion 63 held by the terminal holder 70, and a second connector portion 62 connected to the power supply. Accordingly, since the first held portion 53 and the second held portion 63 are buried in the terminal holder 70, for example, during insert molding, these portions are not shown in the drawings other than FIGS. 6 and 7.

Hereinafter, when the first power supply portion 51 and the second power supply portion 61 are simply referred to as a power supply portion 51 and 61 collectively when these portions are not particularly distinguished from each other. Similarly, when the first connector portion 52 and the second connector portion 62 are simply referred to as a connector portion 52 and 62 when these portions are not particularly distinguished from each other.

Figure 3:
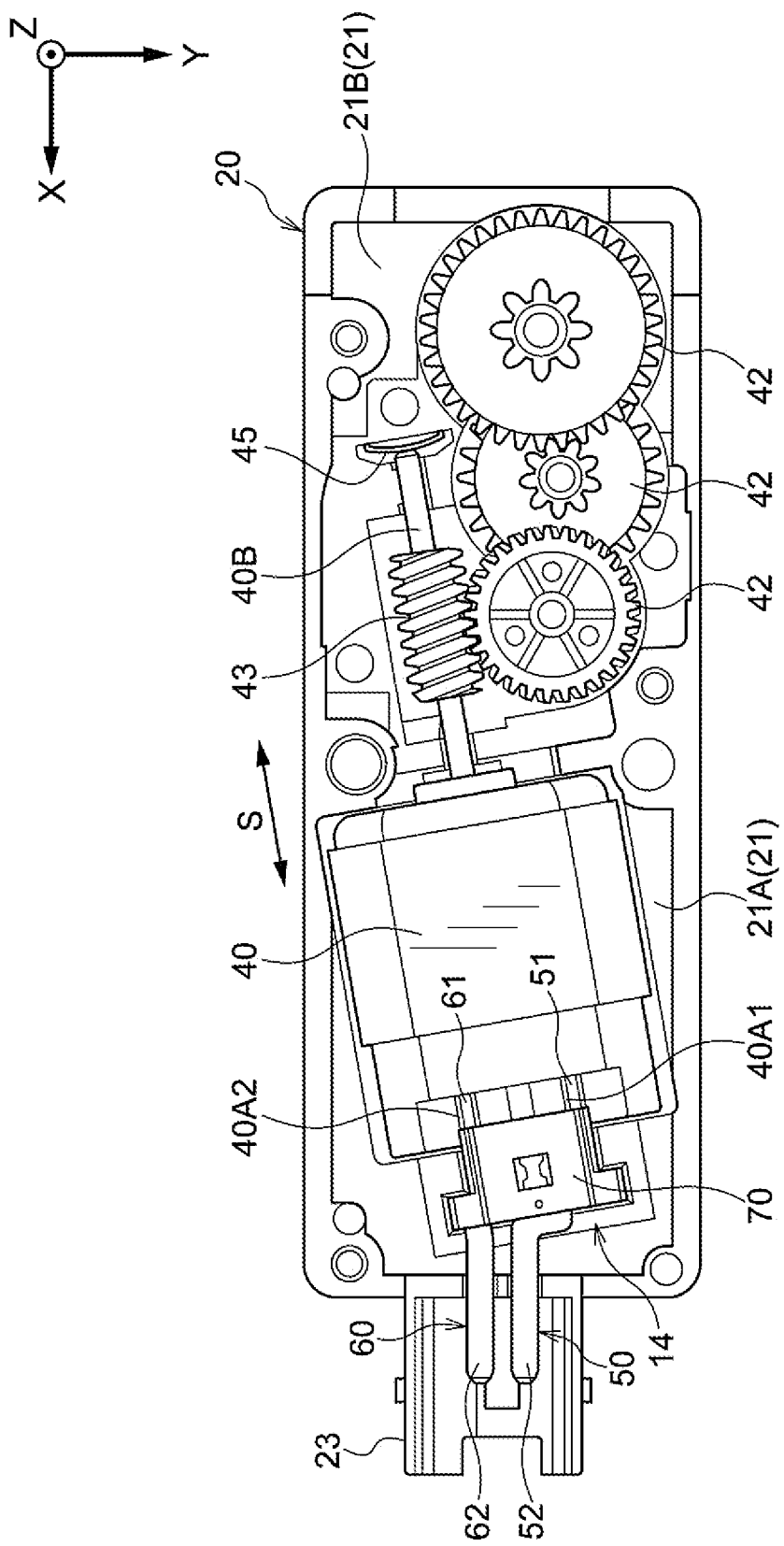
FIG. 3 is a plan view illustrating housing body side members with a holder sub-assembly assembled together by excluding output gears, etc., according to one embodiment of the present disclosure.
Figure 4:
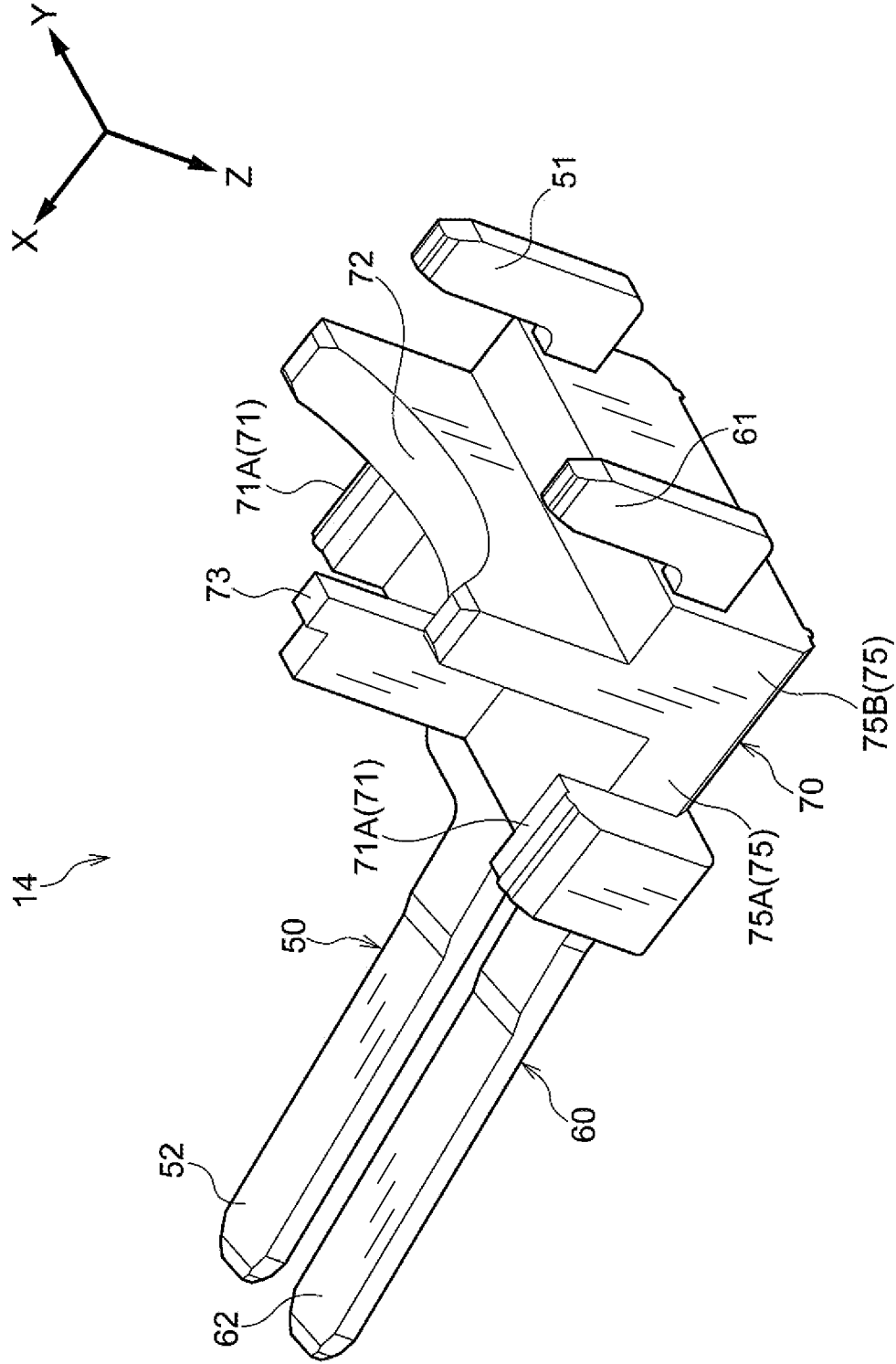
FIG. 4 is a perspective view illustrating the holder sub-assembly shown in FIG. 3, taken from a direction identified by a coordinate system according to one embodiment of the present disclosure.

As shown in FIGS. 3 and 4, the first connector portion 52 and the second connector portion 62 protrude to an outside from the cover 30. Specifically, the first connector portion 52 and the second connector portion 62 protrude in the same direction along the X direction. As shown in FIG. 4 and the like, each of the first connector portion 52 and the second connector portion 62 is flat with a plate thickness in the Z direction. The first connector portion 52 and the second connector portion 62 are inserted into a connector (not shown) provided in the power supply. As a result, the power supply and each of the first connector portion 52 and the second connector portion 62 are electrically connected each other, so that electric power can be supplied from the power supply to the actuator 1.

Further, the terminal holder 70 is made of synthetic resin. The terminal holder 70 is produced by using injection molding with the terminals 50 and 60 already disposed in a molding mold. With this, the pair of terminals 50 and 60 are held by the terminal holder 70 as a result of the insert molding. Hence, the first holder 53 and the second holder 63 are buried in the terminal holder 70, for example, during the molding.

Figure 5:
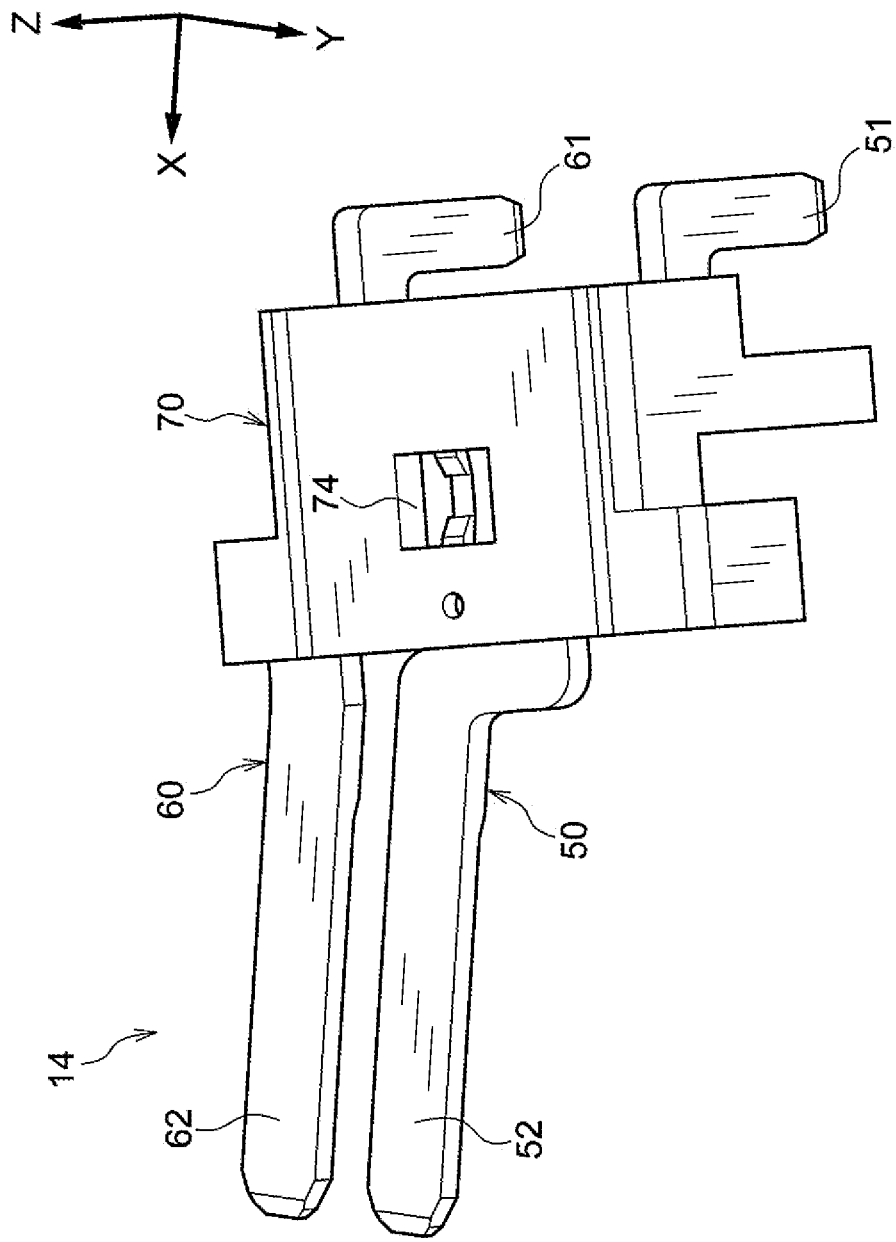
FIG. 5 is also a perspective view illustrating the holder sub-assembly shown in FIG. 3, taken from another direction identified by the coordinate system according to one embodiment of the present disclosure.

Here, at a stage where the terminal holder 70 is produced by the insert molding, the first conductive member 50 and the second conductive member 60 of the pair of terminals 50 and 60 are respectively connected to each other to be united via the connection portion C. However, the connection portion C is subsequently cut and separated after the insert molding, so that the first conductive member 50 and the second conductive member 60 are separated from each other. Hence, the terminal holder 70 is produced to expose the connection portion C connecting the terminals 50 and 60 to an outside from the terminal holder 70 to be cut. Specifically, as shown in FIG. 5, a holder through hole 74 penetrating the terminal holder 70 along the Z direction is formed on the terminal holder 70 above the connection portion C. In addition, as shown in FIG. 1, on the cover 30, a cover through hole 32 is formed corresponding to a position of the holder through hole 74 formed on the terminal holder 70 and the connection portion C connecting the terminals 50 and 60.

Further, as shown in FIG. 6, the first conductive member 50 includes multiple bent portions 50D and 50E connecting the flat plate portions 50A, 50B and 50C, thereby forming multiple plate portions 50A, 50B and 50C facing toward a different direction from each other. Specifically, these multiple flat plates 50A, 50B and 50C are composed of a first plate portion 50A with a plate thickness in the Z direction, a second plate portion 50B with a plate thickness in the thrusting direction S, and a third plate portion 50C with a plate thickness in a direction perpendicular to the thrusting direction S parallel to an XY plane. Specifically, as shown, the first flat plate portion 50A and the second flat plate portion 50B are bent in a thickness direction of the plate at a substantially right angle at a first bent portion 50D and are connected via the first bent portion 50D. The second flat plate portion 50B are similarly bent in a plate thickness direction of the plate substantially at a right angle at a second bent portion 50E, and the third flat plate portion 50C are connected via the second bent portion 50E.

Further, as shown in FIG. 6, the second conductive member 60 includes multiple flat plate portions 60A, 60B and 60C and multiple bent portions 60D and 60E connecting these multiple flat plate portions 60A, 60B and 60C, respectively. The multiple flat plate portions 60A, 60B and 60C are composed of a first plate portion 60A with a plate thickness in the Z direction, a second plate portion 60B with a plate thickness in the thrusting direction S, and a third plate portion 60C with a plate thickness in a direction perpendicular to the thrusting direction S parallel to the XY plane. Hence, the first flat plate portion 60A and the second flat plate portion 60B are connected via a first bent portion 60D at which the plate portions 60A and 60B are bent at a substantially right angle in a plate thickness direction thereof. The second flat plate portion 60B and the third flat plate portion 60C are connected via a second bent portion 60E at which plate portions 60B and 60C are bent substantially at a right angle in a plate thickness direction thereof.

Further, as shown, the first flat plate portion 50A of the first conductive member 50 and the first flat plate portion 60 of the second conductive member 60 are positioned on the same plane. The second flat plate portion 50B of the first conductive member 50 and the second flat plate portion 60B of the second conductive member 60 are also formed on the same plane. However, the third flat plate portion 50C of the first conductive member 50 and the third flat plate portion 60C of the second conductive member 60 face each other in a plate thickness direction thereof.

Further, all of the first bent portions 50D and 60D, the second flat plate portions 50B and 60B, and the second bent portions 50E and 60E of the first conductive member 50 and the second conductive member 60, respectively, are buried in the terminal holder 70, for example, during insert molding. Therefore, respective portions of the first conductive member 50 and the second conductive member 60 not buried in the terminal holder 70, for example, during insert molding, (i.e., respective portions thereof exposed from the terminal holder 70) are not bent in the plate thickness direction thereof.

Further, as shown in FIG. 7, the first flat plate portion 50A of the first conductive member 50 includes a series of first to third portions 50A1, 50A2 and 50A3 extended linearly in a plan view, and extension direction change portions connecting neighboring portions of these portions 50A1, 50A2 and 50A3 with each other. Specifically, the first flat plate portion 50A of the first conductive member 50 includes a first portion 50A1 extended in the X direction, a second portion 50A2 extended in a direction perpendicular to the thrusting direction S, and a third portion 50A3 extended in the thrusting direction S in this order. Hence, among these portions 50A1, 50A2 and 50A3, only the third portion 50A3 extended in the thrusting direction S is buried in the terminal holder 70, for example, during insert molding. That is, the first portion 50A1 extended in the X direction and the second portion extended in the direction perpendicular to the thrusting direction S are exposed from the terminal holder 70. Further, the second portion 50A2 extended in the direction perpendicular to the thrusting direction S is exposed from the terminal holder 70 while contacting the terminal holder 70. Hence, when (the pair of terminals are connected to the external power supply and) a mechanical force is applied to the first connector portion 52 in the X direction, the second portion 50A2 extended in the direction perpendicular to the thrusting direction S receives a reaction force from the terminal holder 70 (at a lower side of second portion 50A2 in FIG. 7).

Further, as shown in FIG. 7, the first flat plate portion 60A of the second conductive member 60 includes a series of first to fourth portions 60A1, 60A2, 60A3 and 60A4 extended linearly in a plan view, and multiple extension direction change portions connecting neighboring portions of these first to fourth portions 60A1, 60A2, 60A3 and 60A4 with each other. Specifically, the first flat plate portion 60A of the second conductive member 60 includes a first portion 60A1 extended in the X direction, a second portion 60A2 extended in the thrusting direction S, and a third portion 60A3 extended in a direction perpendicular to the thrusting direction S in this order. The first flat plate portion 60A of the second conductive member 60 further includes a fourth portion 60A4 extended in the thrusting, direction S next to the third portion 60A3. Among these first to fourth portions, the third portion 60A3 extended in a direction perpendicular to the thrusting direction S and the fourth portion 60A4 extended in the thrusting direction S are buried in the terminal holder 70, for example, during insert molding. Since the third portion 60A3 extended in the direction perpendicular to the thrusting direction S is buried (i.e., fixed) in the terminal holder 70, for example, during insert molding, an end surface of an opposite side (i.e., a lower side in FIG. 7) of the third portion 60A3, which faces toward the thrusting direction S (structurally) receives a reaction force from the terminal holder 70. Hence, when an external force is applied to the second connector portion 62 in an opposite direction to the X direction, the third portion 60A3 extended in the direction perpendicular to the thrusting direction S receives the reaction force from the terminal holder 70.

Further, as shown in FIG. 7, among the first to third portions of the first flat plate portion 50A of the first conductive member 50, the second portion 50A2 extended in the direction perpendicular to the thrusting direction S deviates to a one side (i.e., an upper side in FIG. 7) in the thrusting direction than the third portion 60A3 among the first to fourth portions of the first flat plate portion 60A of the second conductive member 60, extended in the direction perpendicular to the thrusting direction S (i.e., the same direction). Such a second portion 50A2 of the first flat plate portion 50A of the first conductive member 50, extended in the direction perpendicular to the thrusting direction S and the third portion 60A3 of the first flat plate portion 60A of the second conductive member 60, extended in the direction perpendicular to the thrusting direction S are partially overlapped with each other in the direction perpendicular to the thrusting direction S.

Further, as shown in FIG. 4, the terminal bolder 70 includes a holder main body portion 75 in which the pair of terminals 50 and 60 are buried, for example, during insert molding. The holder main body portion 75 is composed of an X direction first side portion 75A and an X direction second side portion 75B along the X direction. Each of the X-direction first side portion 75A and the X-direction second side portion 75B has substantially a cubic shape with three sides extending toward the thrusting direction S and two directions perpendicular to the thrusting direction S. A dimension of the X direction first side portion 75A is smaller than that of the X direction opposite side 75B in the Z direction. A Z-direction first side surface of the X-direction first side portion 75A and a Z-direction first side surface of the X-direction opposite side portion 75B are located on the same plane perpendicular to the Z direction. By contrast, a Z direction second side surface of the X direction first side portion 75A deviates tot one side in the Z direction from a Z direction second side surface of the X direction second side portion 75B. Further, the first flat plate portion 50A of the first conductive member 50 is buried in (i.e., attached to) the X direction first side portion 75A of the holder main body portion 75. Similarly, in the X direction second side portion 75B of the holder main body portion 75 the second flat plate portion 50B and the third flat plate portion 50C of the first conductive member 50 are buried (i.e., attached to).

Further, as shown in FIG. 4, the terminal holder 70 includes a pair of housing engagement portions 71 that engage with the housing 20. Thus, when the housing engagement portions 71 engage with the housing 20, a relative position of the holder sub-assembly 14 is fixed relative to the housing 20. The pair of housing engagement portions 71 are composed of a pair of protruding portions 71A protruding toward the opposite direction to the Z direction shown in FIG. 4, the pair of protruding portions 71A are symmetrical positioned across the output shaft 40B of the motor 40 when the holder sub-assembly 14 is attached to the housing 20. The pair of protruding portions 71A protrude sideward from outer sides of the X direction first side portion 75A of the holder main body portion 75 in a widthwise direction (i.e., a direction perpendicular to the thrusting direction) of the holder main body portion 75.

Further, as shown in FIG. 4, the terminal holder 70 includes a motor engagement portion 72 that pressure contacts an O-ring 40C (see FIG. 2) acting as a part of the motor 40. Hence, when the holder sub-assembly (sub-assembly) 14 is attached to the housing 20, the O-ring 40C of the motor 40 is pressure contacted by the motor engagement portion 72 of the terminal holder 70, thereby fixing the motor 40. The motor engagement portion 72 protrudes from a boundary of the X direction first side portion 75A of the holder main body portion 75 and the X direction second side portion 75B of the holder main body portion 75 toward the opposite direction to the Z direction as shown in FIG. 4. Hence, the motor engagement portion 72 includes an arc-shaped engagement surface. A width of the motor engagement portion 72 is the same as a width of the holder main body portion 75.

Further, as shown in FIG. 4, the terminal holder 70 also includes a plate engagement portion 73 that engages with the hearing plate 44 (see FIG. 2). The plate engagement portion 73 prevents the bearing plate 44 from dropping in the Z direction (i.e., the Z direction shown by the arrow). The plate engagement portion 73 protrudes from the X direction-first side portion 75A of the terminal holder 70 toward the opposite direction to the Z direction in the drawing of FIG. 4. That is, the plate engagement portion 73 protrudes from the X-direction first side portion 75A of the holder main body portion 75.

Further, as shown in FIG. 1, the housing unit 20 and 30 includes pair of connector covers 23 and 33 collectively covering the first connector portion 52 and the second connector portion 62. The pair of connector covers 23 and 33 are composed of a combination of a portion of the housing 20 and a portion of the cover 30. Hence, inside the pair of connector covers 23 and 33, a space is formed into which a connector of the power supply is inserted.

Next, exemplary advantages obtained according to one embodiment of the present disclosure will be hereinbelow described.

First, according, to one embodiment of the present disclosure, the actuator 1 is composed of a combination of the internal components 40, 41 and 42 including, the motor 40, the housing 20, and the cover 30. Specifically, the actuator 1 includes the housing unit 20 and 30 accommodating the internal components 40, 41 and 42, the pair of terminals 50 and 60 for conveying external power to the motor 40, and the terminal holder 70 that holds the pair of terminals 50 and 60.

Hence, in general, if the terminal holder 70 is molded together with the cover 30 (i.e., the pair of terminals 50 and 60 are held by the cover 30) positions of the pair of terminals 50 and 60 are directly affected by a position of the cover 30. Hence, depending on the position of the cover 30, stress is highly likely to partially occur in each of the terminals 50 and 60 (e.g., the power supply portions 51 and 61). In view of this, according to one embodiment of the present disclosure, since the terminal holder 70 is separated from the housing unit 20 and 30, positions of the terminals 50 and 60 are not directly affected by the position of the cover 30. Therefore, stress generally generated in a part of the terminals 50 and 60 (e.g., the power supply portions 51 and 61) can be suppressed or reduced.

Secondly, according to one embodiment of the present disclosure, each of the first power supply portion 51 and the second power supply portion 61 of the pair of terminals 50 and 60 is extended in an opposite direction to the Z direction indicated by the arrow in the drawing, which is an assembly direction in which the pair of terminals 50 and 60 are attached to the motor 40 when the actuator is assembled. In addition, the first power supply portion 51 and the second power supply portion 61 are made planar and face each other along a plate thickness direction of a planar portion thereof (i.e., a direction perpendicular to the thrusting direction S and parallel to the XY plane). As a result, it is easy to change a distance (i.e., a width) between these power supply portions 51 and 61 by deforming these power supply portions 51 and 61 in the plate (i.e., planar portion) thickness direction. Accordingly, the pair of terminals 50 and 60 can be smoothly connected to the pair of motor terminals 40A1 and 40A2 of the motor 40.

Thirdly, as shown in FIG. 4, according to one embodiment of the present disclosure, the terminal holder 70 includes the motor engagement portion 72 that pressure contacts the motor 40. Hence, the motor 40 is depressed by the holder sub-assembly 14 toward the opposite direction to the Z direction shown by the arrow, (i.e., the assembly direction).

Further, according to one embodiment of the present disclosure, the terminal holder 70 also includes the plate engagement portion 73 that pressure contacts the bearing plate 44 that prevents the motor output shaft 40B and the housing 20 from contacting with each other. Hence, the bearing plate 44 is depressed by the holder sub-assembly 14 in the opposite direction to the Z direction shown by arrow in which the holder sub-assembly 14 is attached when assembled into the actuator 1. Here, the bearing plate 44 pressure contacted by the plate engagement portion 73 may be a plate having elasticity, such as the spring cone 45, etc.

Further, according to one embodiment of the present disclosure, the terminal holder 70 holds the pair of terminals 50 and 60 prepared by using insert molding. Then, portions of the pair of terminals 50 and 60 exposed from the terminal holder 70 toward the motor 40 are entirely made planar with a plate thickness direction being perpendicular to the assembly direction (i.e., a direction parallel to the XY plane). Hence, when it is compared with a different type in which the exposed portions include portions with a plate thickness direction being parallel to the assembly direction (for example, see a modification as shown in 8), the exposed portions of one embodiment of the present disclosure rarely deform. That is, when the pair of terminals 50 and 60 are connected to the motor 40, a force is sometimes applied to the respective power supply portions 51 and 61 of the pair of terminals 50 and 60 in the Z direction as shown in the drawing which is the opposite direction to the assembly direction, and the pair of terminals 50 and 60 are likely to deform due to the force. However, according to the above-described configuration of one embodiment of the present disclosure, such deformation can be suppressed or reduced. Further, since a structure of the exposed portion is simple due to the absence of a bent portion, burrs of resin generally generated in the exposed portions when a mold is opened are less likely to occur.

Further, according to one embodiment of the present disclosure, the bent portions 50D and 50E of the first conductive member 50, formed between the first connector portion 52 and the first power supply portion 51, and the bent portions 60D and 60E of the second conductive member 60, formed between the second connector portion 62 and the second power supply portion 61 are entirely buried in the terminal holder 70, for example, during insert molding). Hence, the terminal holder 70 can firmly hold the pair of terminals 50 and 60.

Further, according to one embodiment of the present disclosure, the terminal holder 70 and the portions of the pair of terminals 50 and 60 exposed from the terminal holder 70 toward the motor 40 do not overlap when viewed in the thrusting direction S along which the motor output shall 40B extends. Hence, when compared with an overlapping type shown in FIG. 8, a quantity of a material that constitutes the terminal holder 70 can be reduced.

Further, according to one embodiment of the present disclosure, the respective conductive members 50 and 60 constituting the pair of terminals 50 and 60 have horizontally curved portions 50A2 and 60A3 extended intersecting with the X direction (i.e., the direction perpendicular to the thrusting direction S). Hence, these respective horizontally curved portions 50A2 and 60A3 can receive a reaction force from the terminal holder 70 altogether when the pair of connector portions 52 and 62 receive a force from the power supply. Hence, when the power supply is connected to the pair of connector portions 52 and 62, the conductive members 50 and 60 are effectively inhibited from readily deforming based on the force received by the connector portions 52 and 62 from the power supply. Here, the horizontally curved direction is not necessarily perpendicular (i.e., a vertical direction), and may be enough if another direction intersects one direction. In such a situation, however, it is preferably a direction that forms an angle of about 60 degrees or more.

Figure 8:
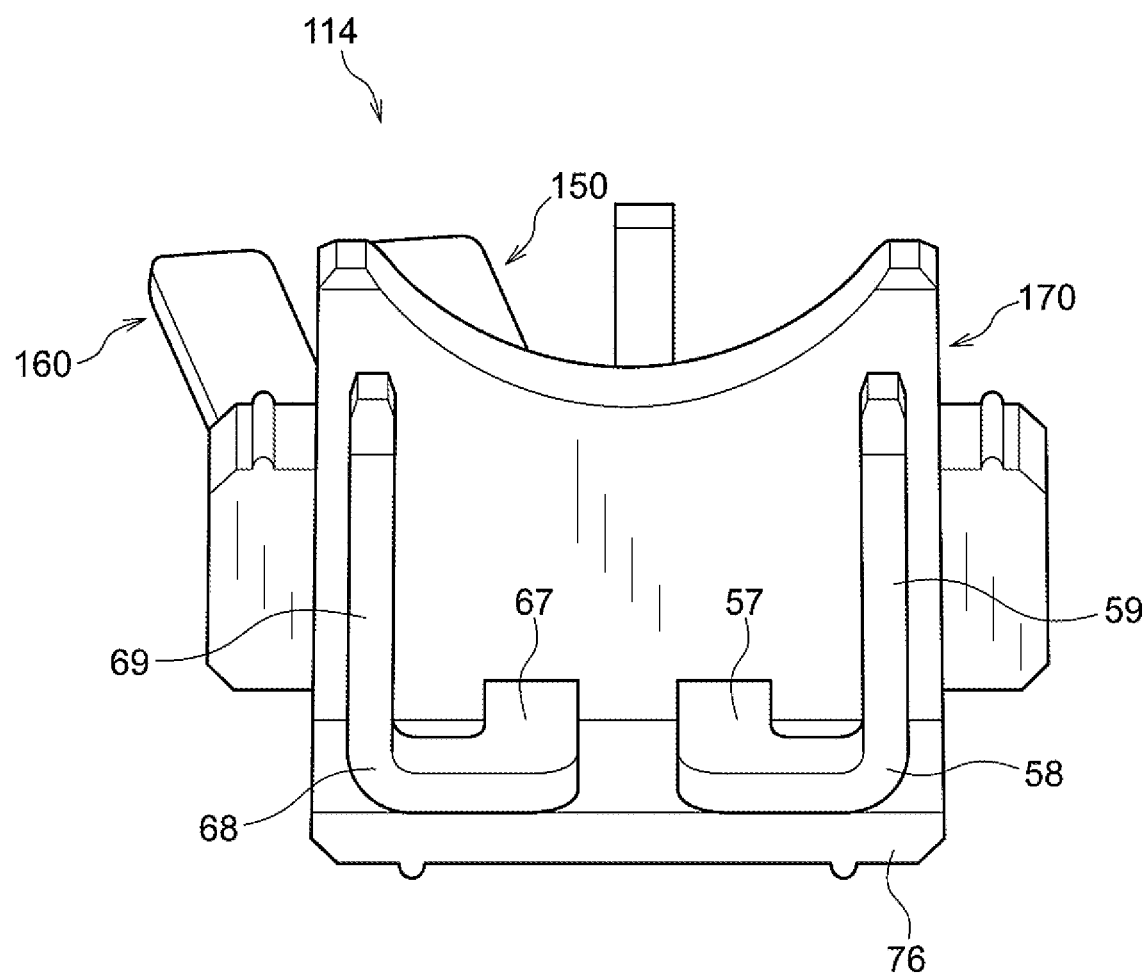
FIG. 8 is a perspective view illustrating a modification of the holder sub-assembly according to another embodiment of the present disclosure.
Figure 9:
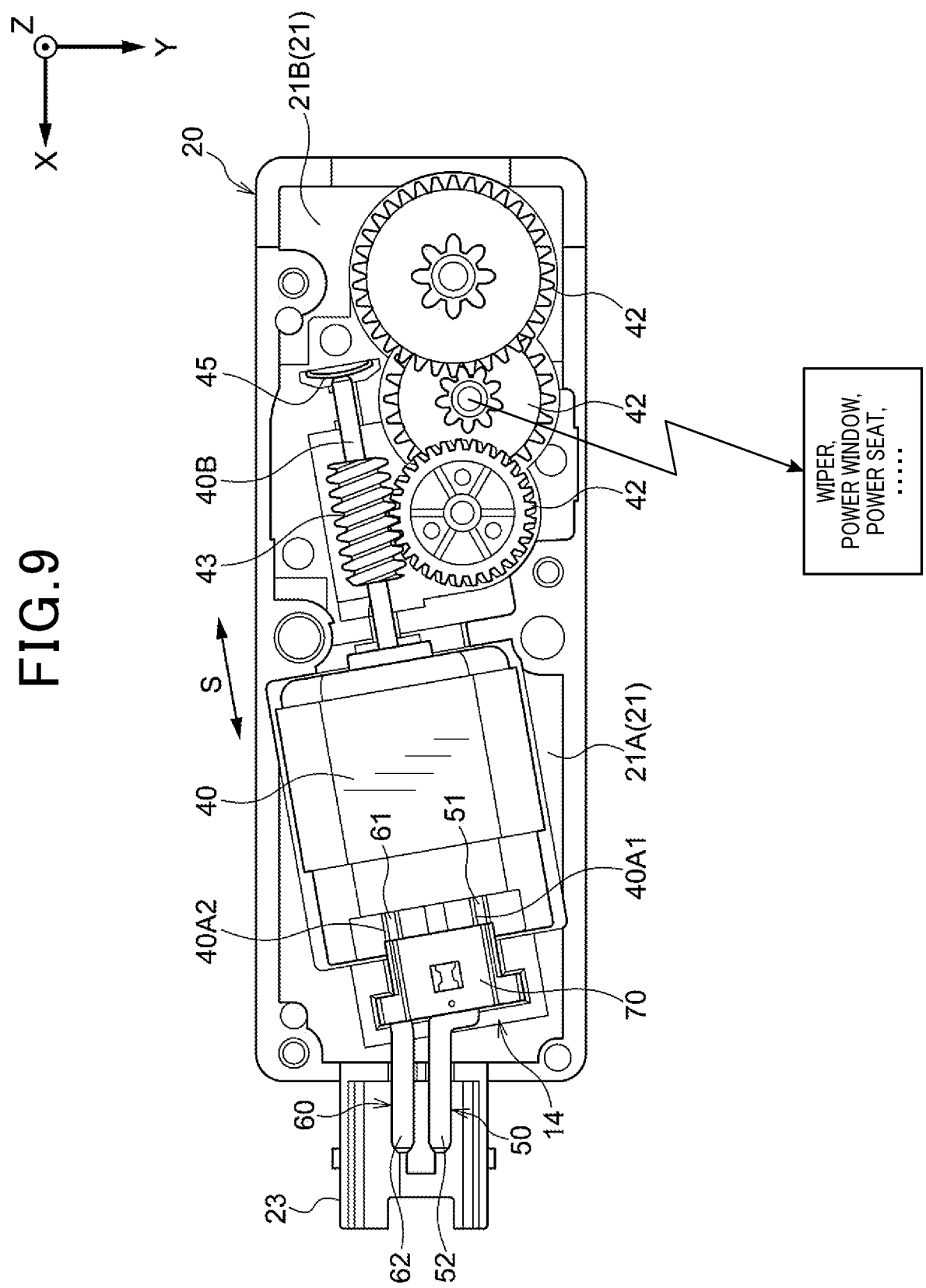
FIG. 9 is a perspective view illustrating a vehicle operation system with the actuator according to another embodiment of the present disclosure.

Herein below, a modification is described with reference to FIG. 8 and applicable one or more drawings. In the above-described embodiment, although the holder sub-assembly 14 is composed as mainly shown in FIGS. 5 and 6, a configuration of the holder sub-assembly is not limited thereto. For example, a holder sub-assembly 114 shown in FIG. 4 may be employed.

Specifically, in the modified holder sub-assembly 114, a pair of terminals 150 and 160 are held by a terminal holder 170 during insert molding as in the above-described embodiment. Further, in the pair of terminals 150 and 160, portions exposed from the terminal holder 170 toward the motor 40 include first flat plate protruding portions 57 and 67 protruding from the terminal holder 170 with a plate thickness direction thereof lacing toward the Z direction as the assembly direction. Also, the respective portions exposed from the terminal holder 170 toward the motor 40 include bent portions 58 and 68, and second flat plate protruding portions 59 and 69 with a plate thickness direction thereof facing in a direction perpendicular to the thrusting direction S in this order.

Further, the terminal holder 170 includes a load receiving portion 76. The load receive portion 76 prevents the terminal 150 and 160 from deforming by receiving a load then the terminals 150 and 160 and the motor 40 are assembled. As shown, the load receiving portion 76 protrudes from the holder main body portion 75 of the terminal holder 170 in the thrusting direction S. At the same time, the load receiving portion 76 deviates from each of the first flat plat protruding portions 57 and 67 toward the Z direction as shown by the arrow. However, as illustrated, the load receiving portion 76 is in contact with each of the first flat plate protruding portions 57 and 67. Hence, according to the holder sub-assembly 114 of the modification, as different from the holder sub-assembly 14 of the above-described embodiment, the terminal holder 170 and the portions of the pair of terminals 150 and 160 exposed from the terminal, holder 170 to the motor 40 overlap with each other when viewed in the thrusting direction S which is an extension direction of the output axis of the motor 40.

Further, according to the above-described embodiment and modification, although the pan of terminals 50 and 60 are held by the terminal holder 70 by using the insert molding, the present disclosure is not limited thereto. For example, the pair of terminals 50 and 60 can be held by the terminal holder 70 by using the conventional technology.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described actuator and may be altered as appropriate. Further, the present disclosure is not limited to the above-described vehicle operation system with the actuator and may be altered as appropriate. Further, the present disclosure is not limited to the above-described method of producing a sub-assembly and may be altered as appropriate.

What is claimed is:

1. An actuator comprising:
a housing unit (i) comprised of a housing and a cover and (ii) housing a motor and a bearing plate configured and positioned in the housing unit to prevent a motor output shaft of the motor and the housing from contacting each other;
a pair of terminals configured to convey external power to the motor; and
a terminal holder that (i) holds the pair of terminals, (ii) is a separate sub-assembly from the housing unit, and (iii) is accommodated in the housing unit, wherein:

the housing and the terminal holder are configured such that the terminal holder is assembled into the housing unit and attached to the housing in a first direction; and
the terminal holder includes a plate engagement portion configured to pressure contact and depress the bearing plate in the first direction.

2. The actuator as claimed in claim 1, wherein:
the pair of terminals have a pair of power supply portions connected to the motor when the actuator is assembled;
the pair of power supply portions are planar and extend in the first direction; and
surfaces of planar portions of the pair of power supply portions face each other in a thickness direction of the planar portions.

3. The actuator as claimed in claim 1, wherein the terminal holder includes a motor engagement portion to hold the motor.

4. The actuator as claimed in claim 1, wherein:
the terminal holder is a molded product with a portion of the pair of terminals embedded in the molded product;
the pair of terminals are partially exposed from the terminal holder to the motor; and
each of portions of the pair of terminals exposed from the terminal holder to the motor is entirely planar and a thickness direction of the each of the portions is perpendicular to the first direction.

5. The actuator as claimed in claim 1, wherein:
the pair of terminals includes a first conductive member and a second conductive member;
the first conductive member includes a first power supply portion connected to the motor and a first connector portion connected to an external power supply;
the second conductive member includes a second power supply portion connected to the motor and a second connector portion connected to the power supply;
the first conductive member includes one or more first bent portions between the first connector portion and the first power supply portion;
the second conductive member includes one or more second bent portions between the second connector portion and the second power supply portion; and
the one or more first bent portions and the one or more second bent portions are embedded in the terminal holder.

6. The actuator as claimed in claim 1, wherein:
the terminal holder is a molded product with the pair of terminals embedded in the molded product;
the pair of the terminals are partially exposed to the motor from the terminal holder; and
the terminal holder and portions of the pair of the terminals exposed to the motor from the terminal holder do not overlap with each other along a direction parallel to an output axis of the motor.

7. The actuator as claimed in claim 1, wherein the bearing plate is directly between an end of the motor output shaft and the housing along a longitudinal axis of the motor output shaft.

8. A method of producing the pair of terminals and the terminal holder of the actuator as claimed in claim 1, the method comprising the steps of:
preparing a conductive flat plate;
applying a punching process to the conductive flat plate thereby obtaining the pair of terminals partially connecting with each other via a connection portion at a middle portion along a longitudinal direction thereof;

bending each of the pair of terminals substantially at a right angle in a plate thickness direction around a first axis at a first portion between the middle portion and one end thereof;

bending each of the pair of terminals substantially at a right angle in a plate thickness direction around a second axis perpendicular to the first axis at a second portion between the first portion and the one end thereof;

inserting the pair of terminals into a molding mold;

molding the terminal holder by applying injection molding together with the pair of terminals other than bent portions bent in the bending processes while forming a through hole at a position above a connection portion connecting the pair of terminals with each other; and cutting the connection portion and separating the pair of terminals from each other after the insert molding is completed.

9. A method of producing the actuator as claimed in claim 1, the method comprising the steps of:

preparing a conductive flat plate;

applying a punching process to the conductive flat plate thereby obtaining the pair of terminals partially connecting with each other via a connection portion at a middle portion along a longitudinal direction thereof;

bending each of the pair of terminals substantially at a right angle in a plate thickness direction around a first axis at a first portion between the middle portion and one end thereof;

bending each of the pair of terminals substantially at a right angle in a plate thickness direction around a second axis perpendicular to the first axis at a second portion between the first portion and the one end thereof;

inserting the pair of terminals into a molding mold;

molding the terminal holder by applying injection molding together with the pair of terminals other than bent portions bent in the bending processes while forming a through hole at a position above a connection portion connecting the pair of terminals with each other; and cutting the connection portion and separating the pair of terminals from each other after the insert molding is completed.

10. An actuator comprising:

a housing unit including a housing and a cover and that houses a motor;

a pair of terminals configured to convey external power to the motor; and a terminal holder that (i) holds the pair of terminals, (ii) is a separate sub-assembly from the housing unit and (iii) is accommodated in the housing unit, wherein:

the pair of terminals is a pair of conductive members;

each of the pair of conductive members extends in a first extension direction and is connected to an external power supply;

at least one of the pair of conductive members includes a contacting portion contacting the power supply and a horizontally curved portion extended in a second direction perpendicular to the first extension direction; and an entirety of the horizontally curved portion is configured to substantially vertically receive a reaction force from or via the terminal holder when the contacting portion is connected to the power supply and receives a mechanical force from the power supply.

* * * * *